United States Patent [19]
Kaspar

[11] Patent Number: 5,462,083
[45] Date of Patent: Oct. 31, 1995

[54] ROTARY PASSAGE

[75] Inventor: Ernst Kaspar, Munderkingen, Germany

[73] Assignee: EC Engineering + Consulting Spezialmaschinen GmbH, Ulm, Germany

[21] Appl. No.: 357,018

[22] Filed: Dec. 16, 1994

[30] Foreign Application Priority Data

Jan. 18, 1994 [DE] Germany .............................. 9400767 U

[51] Int. Cl.[6] .................................................. F16L 27/08
[52] U.S. Cl. .......................................... 137/580; 285/136
[58] Field of Search ............................ 137/580; 285/134, 285/136

[56] References Cited

U.S. PATENT DOCUMENTS

| | | | |
|---|---|---|---|
| 3,062,151 | 11/1962 | Eickmann | 103/121 |
| 3,662,6723 | 5/1972 | Lorence | 74/805 |
| 4,683,912 | 8/1987 | Dubrosky | 137/580 |
| 4,848,400 | 7/1989 | Grant et al. | 137/580 |
| 4,921,010 | 8/1990 | Spirer | 137/580 |
| 5,052,436 | 10/1991 | Bauch et al. | 137/580 |

FOREIGN PATENT DOCUMENTS

| | | | |
|---|---|---|---|
| 0429413 | 5/1991 | European Pat. Off. . | |
| 2134596 | 12/1972 | France . | |
| 1330144 | 9/1973 | United Kingdom | 137/580 |

*Primary Examiner*—A. Michael Chambers
*Attorney, Agent, or Firm*—Rothwell, Figg, Ernst & Kurz

[57] ABSTRACT

The present invention relates to a rotary passage for passing liquids and/or other media between a rotary member (1) and a stationary member (2). The rotary passage according to the invention is characterized in that the rotary member (1) and the stationary member (2) comprise hollow-cylindrical sections (59, 10, 16) respectively lamellarly interlaced in pairs, with two rotary passage stages being formed in that sliding surfaces (3, 3', 4, 4') have provided thereon a plurality of horizontal annular channels (6, 11) which extend in parallel with each other and which respectively interconnect feed lines (7,1 2) of the rotary member (1) to discharge lines (8, 13) of the stationary member (2), and that all of the annular channels (6, 11) of the two rotary passage stages have each assigned thereto upper and lower insulation means (14, 15) on the sliding surface (3, 4).

19 Claims, 3 Drawing Sheets

ROTARY PASSAGE

The present invention relates to a rotary passage for passing liquids and/or other media between a rotary member and a stationary member of the type specified in the preamble of claim 1.

Rotary passages are normally used in automotive vehicles, for instance, in crane vehicles, in which a suitable connection has to be established between the hydraulic supply lines of the rotary top, for instance a crane, and of a vehicle frame which is stationary relative to the crane. Such a rotary passage is, for instance, needed for ensuring the supply of hydraulic oil which is conveyed by a drive pump antirotationally connected to the crane top, to the hydrostatic wheel drives which are stationary relative thereto. To avoid a safety-jeopardizing rotation of the feed lines, a device is normally inserted between drive pump and wheel drive for adapting the rotary movement of the supply lines of the crane top to the stationary supply lines of the vehicle frame.

A rotary passage having a first stationary subassembly connected to the vehicle frame and a second subassembly which is rotational on a crane top and of the above-mentioned type is known from German Utility Model G 93 02 376.6. Oil supply channels which are connected with their upper ends laterally to hydraulic oil inlets are formed in the second subassembly rotating with the rotary top. These oil feed channels terminate each in an annular channel which is open to the respectively adjoining component of the first subassembly fixed onto the frame. Hydraulic oil supply lines which are formed in the members fixed to the frame and through which oil flows from the respective annular channels to the outer surface through outlets laterally at the bottom on the subassembly fixed to the frame, open each into the annular channels (of the rotary subassembly). Four annular channels that can each be brought into engagement in pairs with the clamshell-type subassembly fixed to the frame are provided in the rotary subassembly.

With such a constructional design, however, a satisfactory tightness between the individual passage lines cannot be established in the area of the annular channels between rotary and stationary subassemblies even in the case of high manufacturing demands. Hence, such a rotary passage is hardly suited for the use of passage media differing from hydraulic oil. To permit the use of different media, a passage according to the prior art would have to be equipped with additional leakage lines. Such a measure, however, is very expensive and troublesome with a view to manufacture, since any overlap with the existing feed and discharge system must be avoided. Furthermore, the possibilities of use are very limited with only four oil passages. A considerable increase in the number of passage channels would be difficult to realize in the case of an additional leakage line system.

It is therefore the object of the present invention to provide an improved rotary passage of the above-mentioned type which with a very compact design permits an increased number of passage lines, not only for hydraulic oil, but also for other media.

This object is attained according to the invention through the subject matter of claim 1.

The technical progress which can be achieved with the invention must primarily be seen in the feature that with a relatively small overhall height the rotary passage of the invention permits a multitude of allocation channels through which, moreover, different media that are separated from one another can flow without an additional installation of leakage lines being required. Furthermore, the arrangement of the stationary member on the outside permits the connection of several lines to obtain one channel, resulting in a distributor function. The structure of the rotary passage permits, in addition, an increase in the integration density by way of further passage stages and an electric sliding ring body, respectively.

Other advantages and features of the invention are illustrated in the subclaims.

The invention shall now be explained in more detail with reference to an embodiment and accompanying drawings, in which.

Figure 1:
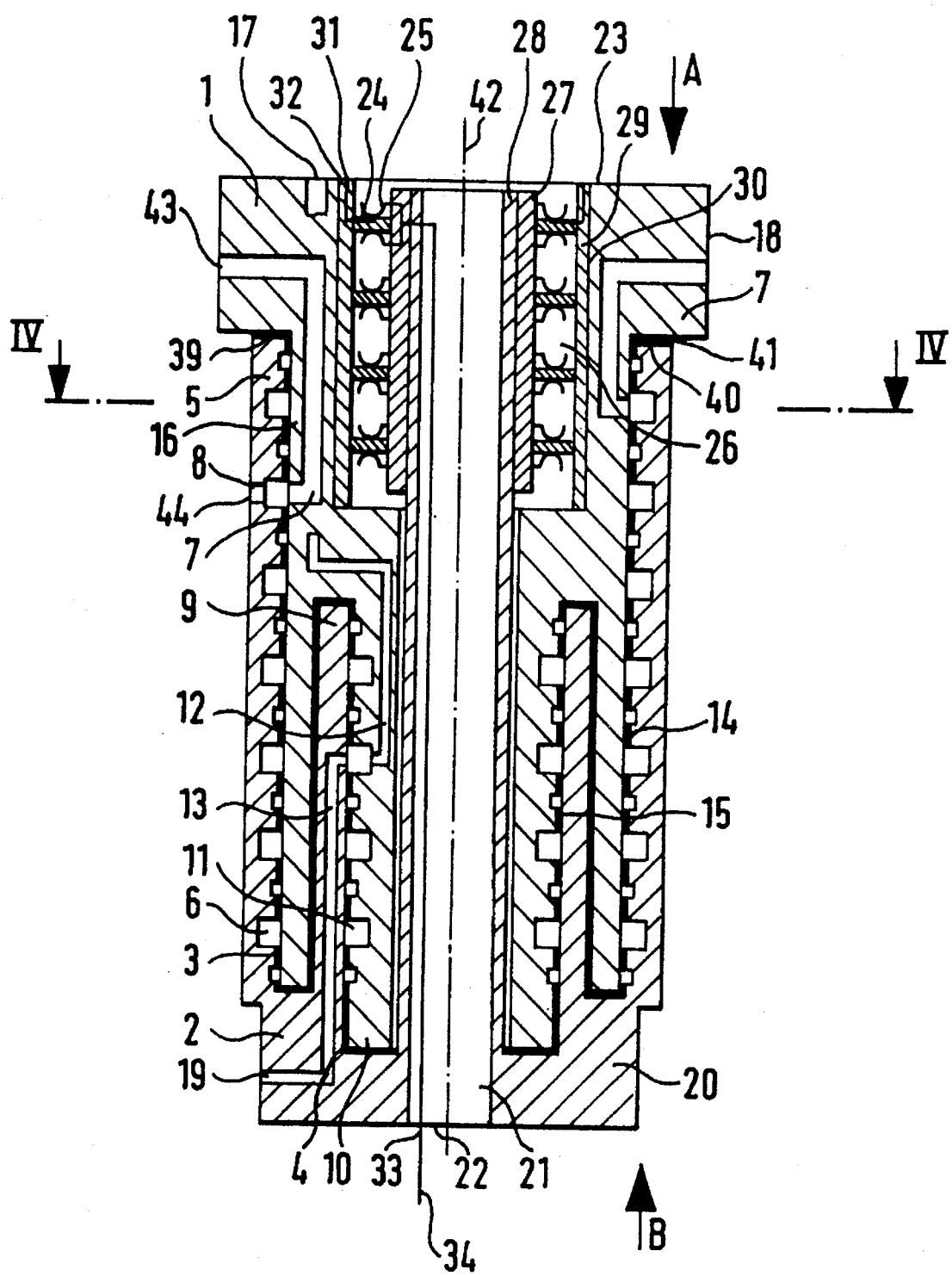
FIG. 1 is a longitudinal section through a rotary passage.

As becomes apparent from FIG. 1, the rotary passage comprises two members 2, 1 that are rotatable relative to each other, with the lower member 2 being stationarily mounted on a vehicle frame, and the upper member 1 being rotationally connected to a rotatable vehicle top.

Three different media shall be passed through in the present embodiment. A first rotary passage stage is predominantly intended for passing hydraulic oil. Oil flows here from a lateral feed connection 43 on the upper section 18 of the rotary member 1 via a feed channel 7 into an annular channel 6 which is formed as an annular groove and belongs to the stationary member 2. Finally, starting from the annular channel, the hydraulic oil flows through a horizontally continuing discharge channel 8 to terminate in a first outlet 44. In the sectional representation according to FIG. 1, feed and discharge channels 7, 8 are illustrated by way of example. The lines of symmetry of all vertical sections of the feed channels 7 have substantially the same radial distance from the center axis 42. The other feed channels are shown in other sectional planes. Further discharge channels 8 are arranged such that they are distributed over the circumference. Two out of a total of seven annular channels 6 are preferably connected to a feed line 7. This permits a double allocation of a channel.

A second rotary passage stage is intended for passing gaseous media. The feed connections 17 are arranged on the upper side of the upper section 18 of the rotary member 1. The feed channel 12 leads from that place to an annular channel 11 in the rotary member. Member 2 which is fixed to the frame and arranged next to the annular channel 11 has provided therein a discharge channel 14 which establishes a connection between the annular channel and a second outlet 19 in the lower section 20 of the stationary member 2. The drawing according to FIG. 1 only illustrates the diagrammatic course of feed channels 12 and discharge channels 13. Two out of a total of five discharge channels 13 of the second rotary passage stage are connected to an annular channel 13. Multi-allocation is thus possible.

Since the feed connections for the hydraulic oil are laterally provided on the upper section 18 of the rotary member 1 and since the feed connections 17 for the gaseous media are arranged on the upper section 18 of the rotary member 1 at the top, an incorrect allocation is avoided. Channels 12, 13 of the second passage stage have a smaller passage cross-section than channels 7, 8 of the first rotary passage stage. This is necessary for achieving a flow rate and amount adapted to the medium. Hence, the arrangement of annular channels 6, 11 on sliding surfaces 3, 3', 4, 4' between stationary and rotary members 2, 1 ensures an open access for the feed channels 7, 12 and discharge channels 8, 13, respectively, in every rotary position of the two members relative to each other. Annular insulation means 14, 15 are provided above and below each annular channel 6, 11 on the sliding surface 3, 4' between rotary and stationary members 1, 2. On the one hand, this permits a reliable tight seal between the individual annular channels on the one hand and two sequentially arranged insulation means between first and second rotary passages on the other hand, thereby ensuring an especially reliable separation between two different passage media. Furthermore, the use of additional leakage lines between the annular channels 6, 11 can thus be dispensed with.

Rotary member 1 and stationary member 2 are in positive lamellar engagement with each other. Two sections 16, 10 of substantially hollow cylindrical configuration of the rotary member 1 are here arranged between three sections 5, 9, 28 of substantially hollow cylindrical configuration of the stationary member 2.

With another rotary passage observing the same functional principle, an outer rotary hollow cylindrical section, and an outer stationary hollow-cylindrical section, an inner rotary hollow-cylindrical section and an inner stationary (hollow) cylindrical section can be arranged from the outside to the inside.

A sliding ring ring body 23 is provided as an integral component of the rotary passage for passing electric currents therethrough. To this end, the sliding ring body 23 is received in a recess 26 of the upper section 18 of the rotary member 1. A rotary sleeve 29 is secured to an inner side 30 of the rotary member 1. Four rings 24 which are arranged in parallel with one another and insulated relative to each other are provided at a right angle from said rotary sleeve 29 in projecting fashion. The electrically conductive rings 24 are in constant sliding contact with double-type sliding clips 25, which are also electrically conductive. The double-type sliding clips 25 are connected via a fixed sleeve 27 to an upper end of the innermost hollow cylindrical section 28 of the stationary member 3. Electric feed lines 31 transmit electric currents from the input terminals 32, which are arranged in circular fashion on the upper side of the rotary member 1, onto rings 24. The double-type sliding clips 25 take up the present current independently of the rotary position of the rotary member. An electric line 33 which can be laid within a bore 21 exits at the bottom side 22 of the stationary member 2, thereby establishing a connection between double-type sliding clip 25 and output terminal 34.

Figure 2:
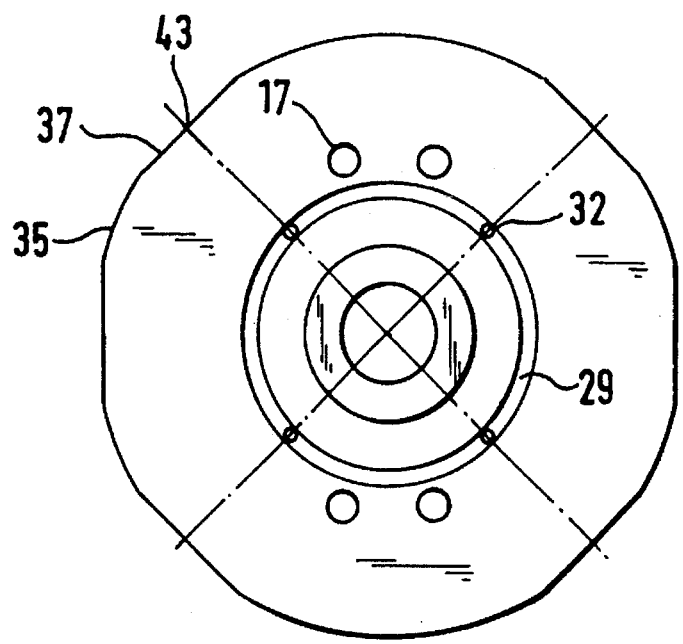
FIG. 2 is a top view on the rotary passage according to FIG. 1 in direction A.

As becomes also apparent from FIG. 1, the rotary member 1 is substantially supported via a bottom side 39 of the upper section 18 of the rotary member 1 on an upper side 40 of the outer hollow cylindrical section 5 of the stationary member. As follows from FIG. 2, the outer contour of the upper section 18 of the rotary member 1 is of predominantly cylindrical shape, with plane sections 37 alternating with rounded sections 35. The plane sections serve here as a flange for the lateral hydraulic oil connections 43. The diagrammatic illustration according to FIG. 2 shows six flanges, with a long rounded section being formed between three flanges. The upper connections 17 for the gaseous medium are only shown in diagrammatic manner. The four electric connections 32 illustrated in FIG. 2 are arranged at quadrantal distances relative to one another.

Figure 3:
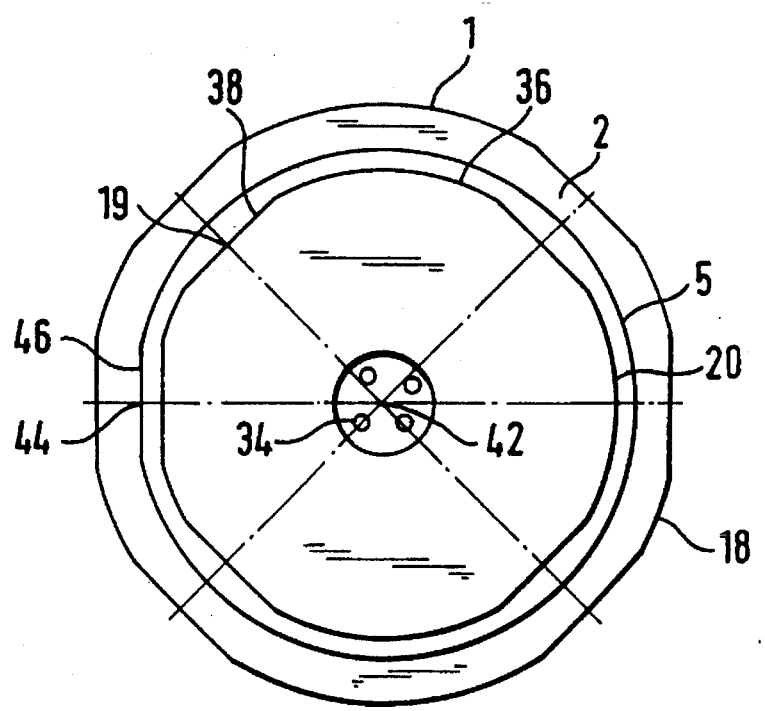
FIG. 3 is a view of the rotary passage in direction B of FIG. 1.

As becomes apparent from FIG. 3, the outer hollow-cylindrical section 5 of the stationary member 2 is provided at one side with a plane flanged section 46 on which the outlet connections 44 of the first rotary passage stage are arranged relative to one another, preferably distributed over the circumference. Five rounded sections 36 alternate with five plane sections 38 on the substantially cylindrical outer contour of the lower section 20 of the stationary member 2. The plane sections serve as flanges on which the outlet connections 19 of the second rotary passage stage are provided. The total outer contour of the rotary passage has a lower section 20 of the stationary member which is continued by means of a projection as a hollow cylindrical section 4. Another projection towards the upper end of the hollow cylindrical section 5 leads to the upper section 18 of the rotary member 1.

Figure 4:
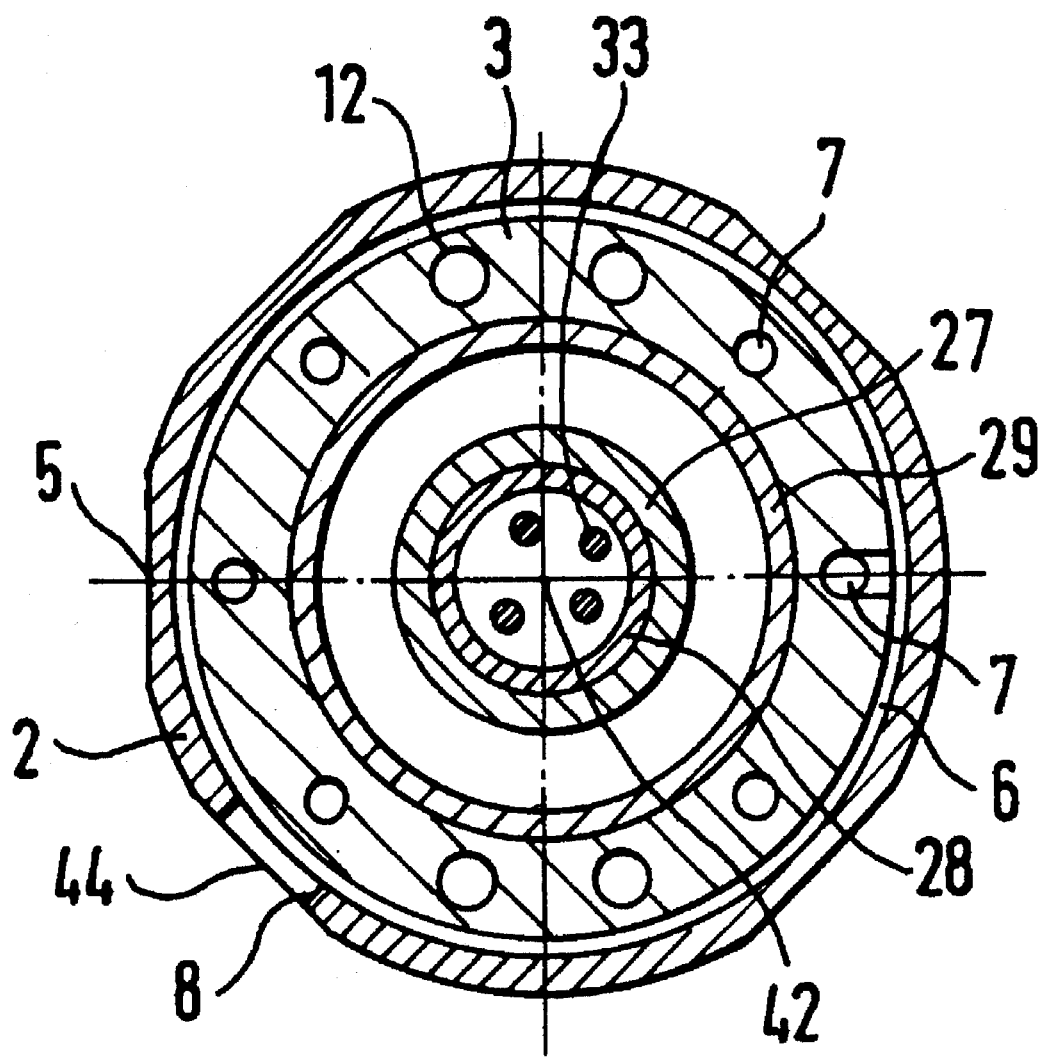
FIG. 4 is a horizontal section of the rotary passage along line IV—IV of FIG. 1.

In accordance with FIG. 4, the axes of symmetry of the feed lines 7, 12 are substantially arranged on a circle having the same radial distance from the center axis 42. Furthermore, FIG. 4 shows the annular configuration of the annular channel 6 with a discharge line 8 and a feed line 7.

I claim:

1. A rotary passage for passing liquids and/or other media between a rotary member and a stationary member, characterized in that an outer stationary hollow-cylindrical section and an outer rotary hollow-cylindrical section, an inner stationary hollow-cylindrical section and an inner rotary (hollow) cylinder are arranged in said rotary passage from the outside to the inside in pairs and in lamellarly interlaced fashion, wherein a first rotary passage stage is formed in that the sliding surface of said outer hollow-cylindrical section of said stationary member is in engagement with a sliding surface of said outer hollow-cylindrical section of said rotary member, and that said sliding surfaces have provided thereon a plurality of horizontal annular channels which extend in parallel with one another and interconnect first feed lines of said rotary member to first discharge lines of said stationary member, that a second rotary passage stage is formed in that a sliding surface of said inner hollow-cylindrical section of said stationary member is in engagement with a sliding surface of said inner hollow-cylindrical section of said rotary member, and that said sliding surfaces in said inner hollow-cylindrical section have provided thereon a plurality of horizontal annular channels which extend in parallel with one another and interconnect second feed lines of said rotary member to second discharge lines of said stationary member, and that all of said annular channels of said two rotary passage stages have each assigned thereto upper and lower insulation means on said sliding surface.

2. A rotary passage according to claim 1, wherein another different transmission medium is intended for each rotary passage stage.

3. A rotary passage according to claim 2, wherein a liquid transmission medium can flow through said first rotary passage stage and a gaseous transmission medium can flow through said second rotary passage stage.

4. A rotary passage according to claim 1, wherein said rotary passage comprises at least two rotary passage stages.

5. A rotary passage according to claim 1, wherein the number of said annular channels of said first rotary passage stage can be selected independently of the number of said annular channels of said second rotary passage stage.

6. A rotary passage according to claim 1, wherein said annular channels of said first rotary passage stage are provided in said outer hollow cylindrical section.

7. A rotary passage according to claim 1, wherein said upper and lower sections of said rotary and stationary members have a substantially rotationally symmetrical cylindrical shape, with rounded outer surfaces alternating with plane outer surfaces.

8. A rotary passage according to claim 7, wherein said inlets are provided on said plane outer surfaces, said first outlets on said plane outer surfaces and said second outlets on a plane outer surface.

9. A rotary passage according to claim 1, wherein inlets which are separated from each other are provided on said upper section of said rotary member, and that second outlets are arranged on said lower section, and that first outlets are arranged at the side of said hollow cylindrical section in horizontally extending direction with respect to each other.

10. A rotary passage according to claim 1, wherein the feed lines of the respective rotary passage stage and the discharge lines of the respective rotary passage stage at the same level in said rotary passage have each substantially the same radial distance from a center axis.

11. A rotary passage according to claim 1, wherein said rotary passage has a central bore.

12. A rotary passage according to claim 11, wherein said central bore (21) is provided in said stationary member (2).

13. A rotary passage according to claim 12, wherein said sliding ring body has electrically conductive contacts which are insulated relative to each other and connected in anti-rotational fashion to said rotary member, and that said sliding ring body has electrically conductive contacts which are insulated relative to each other and fixedly connected to said stationary member and are in engagement with a respectively associated rotary contact.

14. A rotary passage according to claim 13, wherein said rotary contacts are formed as rings and said stationary contacts as double-type sliding clips.

15. A rotary passage according to claim 11, wherein said stationary contacts are connected within an upper recess of said rotary passage to a stationary sleeve on a stationary hollow-cylindrical section whose cavity is formed by said central bore, and said rotary contacts are connected to a rotary sleeve on the vertical inner side of said upper recess of said rotary member.

16. A rotary passage according to claim 11, wherein said rotary electric lines are connected to input terminals on said rotary sleeve, and that said stationary electric lines can be guided out through said stationary sleeve and via said bore downwards and are supplied to said output terminals.

17. A rotary passage according to claim 1, wherein said rotary passage has a sliding ring body (23) for transmitting electric currents.

18. A rotary passage according to claim 17, wherein said sliding ring body is an integral component of said rotary passage.

19. A rotary passage according to claim 1, wherein said rotary member is supported substantially via a bottom side of said upper section of said rotary member on an upper side of said outer hollow-cylindrical section of said stationary member.

* * * * *

UNITED STATES PATENT AND TRADEMARK OFFICE
CERTIFICATE OF CORRECTION

PATENT NO. : 5,462,083

DATED : October 31, 1995

INVENTOR(S) : ERNST KASPAR

It is certified that error appears in the above-identified patent and that said Letters Patent is hereby corrected as shown below:

On the Title page, item [56], U.S. Patent Documents;

"3,662,6723" should read --3,662,623--.

<u>COLUMN 5</u>
Line 17, "(21)" and "(2)" should be deleted.

<u>COLUMN 6</u>
Line 16, "(23)" should be deleted.

Signed and Sealed this

First Day of October, 1996

Attest:

BRUCE LEHMAN

Attesting Officer Commissioner of Patents and Trademarks